(12) United States Patent
Runkle et al.

(10) Patent No.: US 9,208,909 B2
(45) Date of Patent: Dec. 8, 2015

(54) SYSTEMS AND METHODS FOR RETAINING AND REMOVING IRRADIATION TARGETS IN A NUCLEAR REACTOR

(71) Applicant: GE-Hitachi Nuclear Energy Americas, LLC, Wilmington, NC (US)

(72) Inventors: Gary A. Runkle, San Jose, CA (US); Jack T. Matsumoto, San Jose, CA (US); Yogeshwar Dayal, San Jose, CA (US); Mark R. Heinold, San Jose, CA (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 515 days.

(21) Appl. No.: 13/710,090

(22) Filed: Dec. 10, 2012

(65) Prior Publication Data
US 2013/0177126 A1 Jul. 11, 2013

Related U.S. Application Data (63) Continuation-in-part of application No. 13/477,244, filed on May 22, 2012, and a continuation-in-part of application No. 13/339,345, filed on Dec. 28, 2011.

(51) Int. Cl.
*G21C 23/00* (2006.01)
*G21C 19/19* (2006.01)
(Continued)

(52) U.S. Cl.
CPC .............. *G21C 19/19* (2013.01); *G21C 19/32* (2013.01); *G21C 23/00* (2013.01); *G21G 1/02* (2013.01)

(58) Field of Classification Search
CPC .......... G21G 1/02; G21C 19/06; G21C 19/10; G21C 19/16; G21C 19/18; G21C 19/22; G21C 19/32; G21C 23/00; F16K 3/0209; F16K 3/12; F16K 3/26; B07C 5/04; B07C 5/07
See application file for complete search history.

(56) References Cited

U.S. PATENT DOCUMENTS 3,069,337 A * 12/1962 Cabell ........................... 376/342
3,780,982 A * 12/1973 Kemp ............................ 251/210
(Continued)

FOREIGN PATENT DOCUMENTS

EP 2093773 A2 8/2009

OTHER PUBLICATIONS

PCT Invitation to pay additional fees issued in connection with corresponding WO Patent Application No. US2013/065809 dated on Jul. 7, 2014.
(Continued)

*Primary Examiner* — Jack W Keith
*Assistant Examiner* — Sharon M Davis
(74) *Attorney, Agent, or Firm* — Ryan Alley Intellectual Property Law (57) ABSTRACT

A retainer is placed on a conduit to control movement of objects within the conduit in access-restricted areas. Retainers can prevent or allow movement in the conduit in a discriminatory fashion. A fork with variable-spacing between prongs can be a retainer and be extended or collapsed with respect to the conduit to change the size of the conduit. Different objects of different sizes may thus react to the fork differently, some passing and some being blocked. Retainers can be installed in inaccessible areas and allow selective movement in remote portions of conduit where users cannot directly interface, including below nuclear reactors. Position detectors can monitor the movement of objects through the conduit remotely as well, permitting engagement of a desired level of restriction and object movement. Retainers are useable in a variety of nuclear power plants and with irradiation target delivery, harvesting, driving, and other remote handling or robotic systems.

17 Claims, 5 Drawing Sheets

(51) Int. Cl.
*G21C 19/32* (2006.01)
*G21G 1/02* (2006.01)

(56) References Cited

U.S. PATENT DOCUMENTS

| | | |
|---|---|---|
| 3,940,318 A | 2/1976 | Arino |
| 3,959,071 A * | 5/1976 | Bevilacqua ............ 376/228 |
| 4,196,047 A | 4/1980 | Mitchem |
| 4,354,663 A * | 10/1982 | Vanderburg et al. ...... 251/210 |
| 4,393,510 A | 7/1983 | Lang |
| 4,663,111 A | 5/1987 | Kim |
| 5,910,971 A | 6/1999 | Ponomarev-Stepnoy |
| 6,678,344 B2 | 1/2004 | O'Leary |
| 2004/0105520 A1 | 6/2004 | Carter |
| 2007/0086556 A1 | 4/2007 | Nakamura et al. |
| 2009/0135983 A1 | 5/2009 | Russell, II |
| 2009/0213977 A1 * | 8/2009 | Russell et al. ............ 376/170 |
| 2011/0051872 A1 | 3/2011 | Rickard |
| 2011/0051874 A1 | 3/2011 | Allen |
| 2011/0051875 A1 | 3/2011 | Bloomquist |
| 2011/0216868 A1 | 9/2011 | Russell, II |
| 2011/0216870 A1 | 9/2011 | Johnson |
| 2012/0001012 A1 | 1/2012 | Yasuta |
| 2013/0177126 A1 | 7/2013 | Runkle |

OTHER PUBLICATIONS

International Search Report and Written Opinion issued in connection with corresponding PCT Application No. PCT/US2013/065809 on Sep. 15, 2014.

* cited by examiner

SYSTEMS AND METHODS FOR RETAINING AND REMOVING IRRADIATION TARGETS IN A NUCLEAR REACTOR

PRIORITY STATEMENT

This application is a continuation-in-part of, and claims priority under 35 U.S.C. §120 to, co-pending application Ser. No. 13/477,244 filed May 22, 2012, the contents of said application being incorporated by reference herein in their entirety.

GOVERNMENT SUPPORT

This invention was made with Government support under contract number DE-FC52-09NA29626, awarded by the U.S. Department of Energy. The Government has certain rights in the invention.

BACKGROUND

Elements, and specific isotopes thereof, may be formed by bombarding parent materials with appropriate radiation to cause a conversion to desired daughter isotopes. For example, precious metals and/or radioisotopes may be formed through such bombardment. Conventionally, particle accelerators or specially-designed, non-commercial test reactors are used to achieve such bombardment and produce desired isotopes in relatively small amounts.

Radioisotopes have a variety of medical and industrial applications stemming from their ability to emit discreet amounts and types of ionizing radiation and form useful daughter products. For example, radioisotopes are useful in cancer-related therapy, medical imaging and labeling technology, cancer and other disease diagnosis, and medical sterilization.

Radioisotopes having half-lives on the order of days or hours are conventionally produced by bombarding stable parent isotopes in accelerators or low-power, non-electricity-generating reactors. These accelerators or reactors are on-site at medical or industrial facilities or at nearby production facilities. Especially short-lived radioisotopes must be quickly transported due to the relatively quick decay time and the exact amounts of radioisotopes needed in particular applications. Further, on-site production of radioisotopes generally requires cumbersome and expensive irradiation and extraction equipment, which may be cost-, space-, and/or safety-prohibitive at end-use facilities.

SUMMARY

Example embodiments include systems for moving and managing objects through a nuclear reactor, where access may be limited. For example, irradiation targets, instrumentation, and/or other objects can be moved into, and maintained in, one or even several instrumentation tubes in a reactor during operation. Example systems include a traversable path connecting the instrumentation tube(s) and a retainer along such paths to control movement of irradiation targets or other objects traversing the path. Example embodiment retainers include any type of movement restrictor, including a retention mechanism that can limit or prevent movement along the path in a discriminatory fashion, to allow passage of only desired objects. For example, an example embodiment retention assembly includes a restriction fork that can move into and squeeze an area available for passage, preventing objects larger than the fork tines' separation from passing. The fork tines can have variable separation, such that when the fork is retracted/extended the amount of area available for passage, and thus objects moveable through the path, changes as desired. For example, irradiation targets can be blocked or held in an instrumentation tube for irradiation while a driving plunger that pushed the targets is retractable through the fork. Example retainers can be compact and/or self-contained with their own motors and actuation/communication circuitry so as to be placeable in space-limited areas within nuclear power plants, including at instrumentation tube flanges. Example embodiments may further include position detectors to appropriately move and hold objects within the paths at desired, such as at irradiation positions for the creation of desired isotopes or blocking or reducing movement at other sensitive positions. Example embodiment retainers are useable in a variety of access-restricted and space-limited areas within any facility, and with a variety of different systems, including irradiation target delivery/harvesting/driving systems, instrumentation systems, and/or multiple-use systems, that can remotely and/or automatically move objects through the areas without direct user interaction.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the scope of the appended claims; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to in a spatial or physical relationship, as being "connected," "coupled," "mated," "attached," or "fixed," to another element, it can be directly connected or coupled to the other element or intervening elements may be present. In contrast, when an element is referred to as being "directly connected" or "directly coupled" to another element, for example, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that terms like "have," "having," "comprises," "comprising," "includes," and/or "including," when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Figure 1:
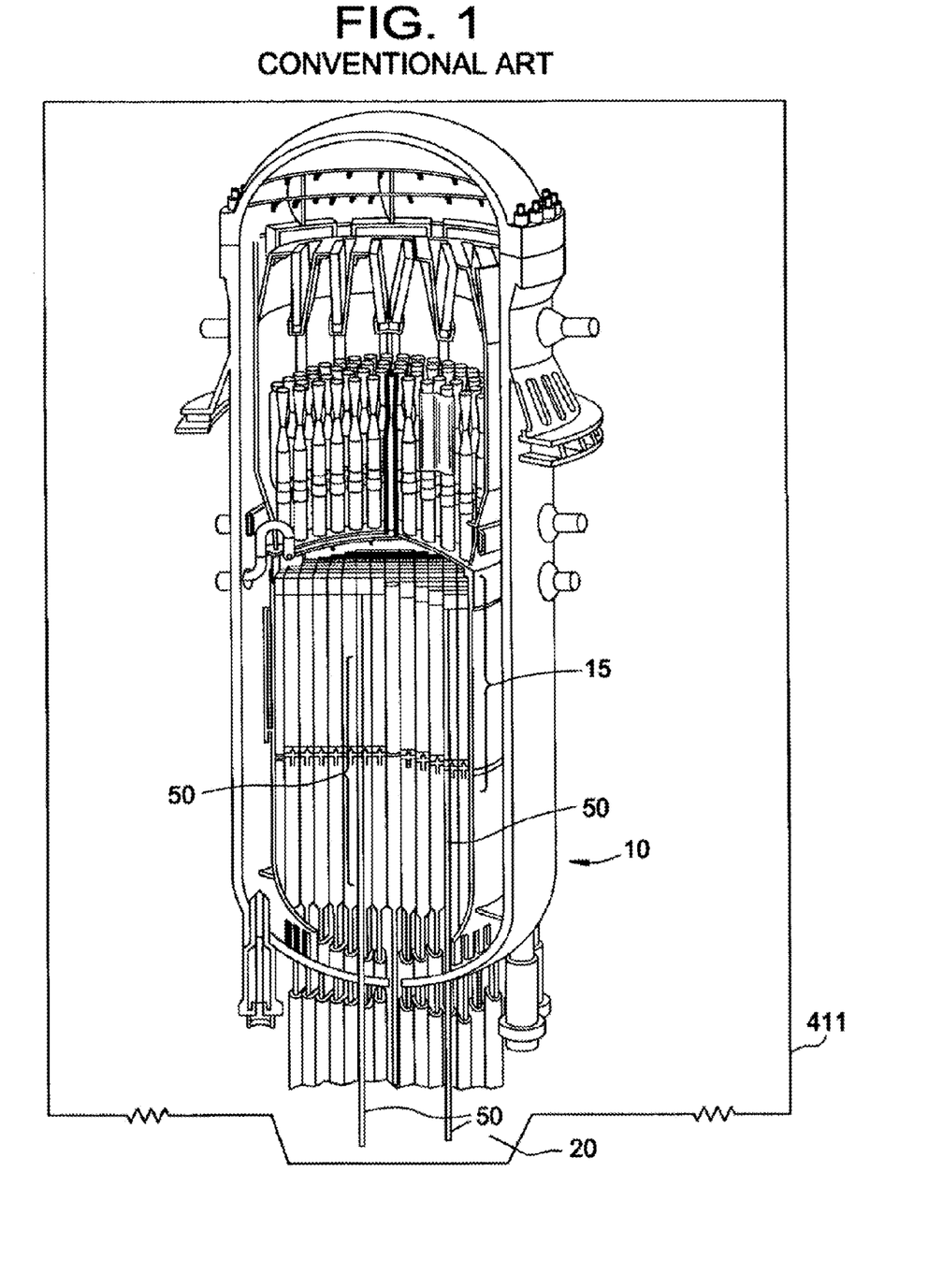
FIG. 1 is an illustration of a conventional commercial nuclear reactor.

FIG. 1 is an illustration of a conventional nuclear reactor pressure vessel 10 usable with example embodiments and example methods. Reactor pressure vessel 10 may be, for example, a 100+ MWe commercial light water nuclear reactor conventionally used for electricity generation throughout the world. Reactor pressure vessel 10 is conventionally contained within an access barrier 411 that serves to contain radioactivity in the case of an accident and prevent access to reactor 10 during operation of the reactor 10. As defined herein, an access barrier is any structure that prevents human access to an area during operation of the nuclear reactor due to safety or operational hazards such as radiation. As such, access barrier 411 may be a containment building sealed and inaccessible during reactor operation, a drywell wall surrounding an area around the reactor, a reactor shield wall, a human movement barrier preventing access to instrumentation tube 50, etc.

A cavity below the reactor vessel 10, known as a drywell 20, serves to house equipment servicing the vessel such as pumps, drains, instrumentation tubes, and/or control rod drives. As shown in FIG. 1 and as defined herein, at least one instrumentation tube 50 extends into the vessel 10 and near, into, or through core 15 containing nuclear fuel and relatively high levels of neutron flux and other radiation during operation of the core 15. As existing in conventional nuclear power reactors and as defined herein, instrumentation tubes 50 are enclosed within vessel 10 and open outside of vessel 10, permitting spatial access to positions proximate to core 15 from outside vessel 10 while still being physically separated from innards of the reactor and core by instrumentation tube 50. Instrumentation tubes 50 may be generally cylindrical and may widen with height of the vessel 10; however, other instrumentation tube geometries may be encountered in the industry. An instrumentation tube 50 may have an inner diameter of about 1-0.5 inch, for example.

Instrumentation tubes 50 may terminate below the reactor vessel 10 in the drywell 20. Conventionally, instrumentation tubes 50 may permit neutron detectors, and other types of detectors, to be inserted therein through an opening at a lower end in the drywell 20. These detectors may extend up through instrumentation tubes 50 to monitor conditions in the core 15. Examples of conventional monitor types include wide range detectors (WRNM), source range monitors (SRM), intermediate range monitors (IRM), and traversing Incore probes (TIP). Access to the instrumentation tubes 50 and any monitoring devices inserted therein is conventionally restricted to operational outages due to containment and radiation hazards.

Although vessel 10 is illustrated with components commonly found in a commercial Boiling Water Reactor, example embodiments and methods are useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes at several different positions from those shown in FIG. 1 may be useable with example embodiments and methods. As such, instrumentation tubes useable in example methods may be at any geometry about the core that allows enclosed access to the flux of the nuclear core of various types of reactors.

Applicants have recognized that instrumentation tubes 50 may be useable to relatively quickly and constantly generate short-term radioisotopes on a large-scale basis without interfering with an operating or refueling core 15. Applicants have further recognized a need to generate short-term radioisotopes and remove them from within access barrier 411 quickly, without having to shut down an operating nuclear reactor to access an area within access barrier 411. Example methods include inserting irradiation targets into instrumentation tubes 50 and exposing the irradiation targets to the core 15 while operating or producing radiation, thereby exposing the irradiation targets to the neutron flux and other radiation commonly encountered in the operating core 15. The core flux over time converts a substantial portion of the irradiation targets to a useful mass of radioisotope, including short-term radioisotopes useable in medical applications. Irradiation targets may then be withdrawn from the instrumentation tubes 50, even during ongoing operation of the core 15, and removed for medical and/or industrial use.

Applicants have further recognized a need for a maximized amount of radioisotope production within instrumentation tubes 50, but also identified that such need is limited by relatively few and sensitive pathways through access barrier 411 during operation. Such pathways through access barrier 411 may require compatibility with existing instrumentation, including TIP probes that are inserted into instrumentation tubes 50 during TIP runs. Example embodiments and methods address this problem by permitting irradiation targets 250 to be inserted into and removed from instrumentation tubes 50 from a first access point, while reliably permitting TIP tubes to be inserted and removed at other instances from the instrumentation tubes 50 from a second access point. In this way, multiple operations and use of instrumentation tubes 50 can be safely achieved in an access-sensitive environment such as a nuclear power plant.

Figure 2:
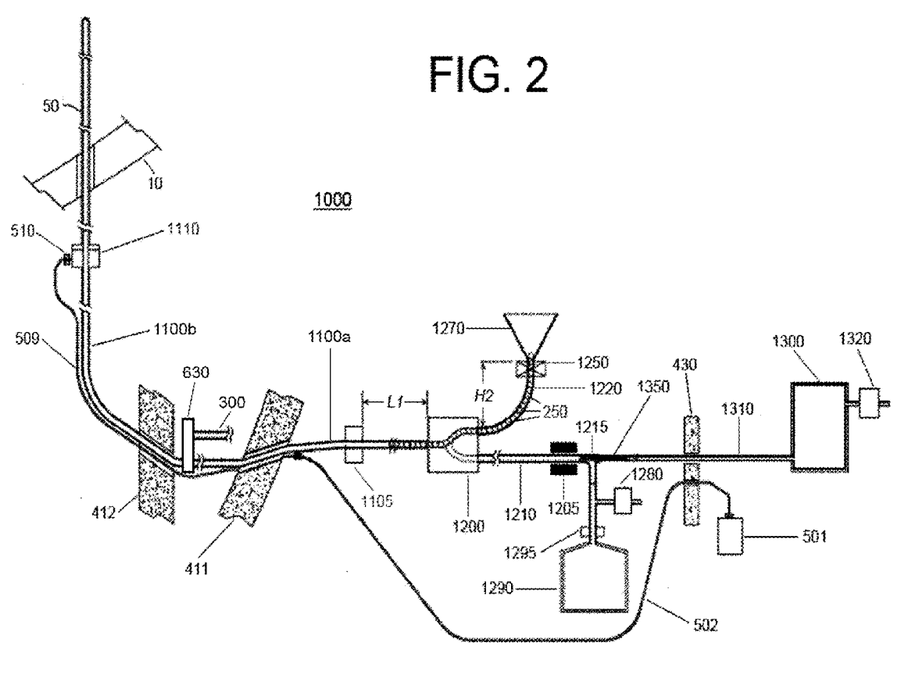
FIG. 2 is an illustration of an example embodiment irradiation target system.

FIG. 2 is a schematic drawing of an example embodiment irradiation target delivery and retrieval system 1000 having a penetration pathway, a loading/offloading system, and a drive system. FIG. 2 illustrates various components of example system 1000 in a loading configuration, parts of which are also described in US Patent Publication 2013/0170927, titled "Systems and Methods for Processing Irradiation Targets Through a Nuclear Reactor," filed Dec. 28, 2011, said application incorporated by reference herein in its entirety. As shown in FIG. 2, example embodiment irradiation target delivery and retrieval system 1000 may include or use one or more elements to facilitate irradiation target loading, irradiation, and harvesting in a timely, automatic, and/or consumption-enhancing manner. System 1000 includes a penetration pathway that provides a path from outside access barrier 411 to instrumentation tube 50 for one or more irradiation targets, a loading/offloading system that permits new irradiation targets to be inserted and irradiated targets to be harvested outside access barrier 411, and a drive system that moves irradiation targets between instrumentation tube 50 and loading/offloading in example embodiment system 1000.

A penetration pathway in example embodiment system 1000 provides a reliable path of travel for irradiation targets 250 between an accessible location, such as an offloading or loading area outside access barrier 411 into one or more instrumentation tubes 50, so irradiation targets 250 can move within the pathway to a position in or near an operating nuclear core 15 for irradiation. Example pathways can include many delivery mechanisms used alone or in combination, including tubing, frames, wires, chains, conveyors, etc. in example embodiment system 1000 to provide a transit path for an irradiation target between an accessible location and an operating nuclear core. As a specific example shown in FIG. 2, a penetration pathway may include penetration tubing 1100, including 1100a and 1100b, running between, either in portions or continuously, a loading junction 1200 and instrumentation tube 50 in a nuclear reactor.

Penetration tubing 1100 may be flexible or rigid and sized to appropriately permit irradiation targets 250 to enter into and/or through penetration tubing 1100 and navigate various structures and penetrations in and within access barrier 411. Penetration tubing 1100 may be continuously sealed or include openings, such as at connecting junctions. Penetration tubing 1100 may junction with other tubes and/or structures and/or include interruptions. One possible advantage of penetration tubing 1100 being sealed and securely mating at junctures and/or with any terminal/originating points is that penetration tubing 1100 better maintains pneumatic pressure that can be used for target withdrawal, and also may provide additional containment for irradiation targets 250 and any products (gas, fluid, solid, particulate, etc.) formed as irradiation products in example embodiment system 1000.

Penetration tubing 1100 may be fabricated of a material that maintains its physical characteristics in an operating nuclear reactor environment and does not significantly react with or entrain materials from irradiation targets 250 coming into contact therewith, including, for example, aluminum, stainless steel, carbon steel, nickel alloys, PVC, PFA, rubber, etc. Penetration tubing 1100 may be cylindrical or any other shape that permits irradiation targets 250 to enter into and/or pass through penetration tubing 1100. For example, penetration tubing 1100 may have a generally circular cross section with a 0.5-inch diameter and smooth interior surface that permits spherical irradiation target 250 to roll within penetration tubing 1100. One potential advantage of using such an example penetration tubing 1100 may be roughly matching diameters and geometries with instrumentation tubes 50 for consistent irradiation target movement therein; however, alternate geometries, shapes, and sizes for penetration tubing 1100, or any other penetration pathway used in example embodiments, including those that limit movement, may be desirable, advantageous, and used.

Penetration tubing 1100 used in example embodiment system 1000 provides a route from an origin at loading junction 1200, where irradiation targets may enter/exit penetration tubing 1100 outside of access barrier 411. As shown in FIG. 2, for example, penetration tubing 1100 leads irradiation targets 250 from loading junction 1200 to access barrier 411, which may be, for example, a steel-lined reinforced concrete containment wall or drywell wall or any other access restriction in conventional nuclear power stations.

Penetration pathways usable in example embodiment system 1000 provide a route through access barrier 411 and to reactor vessel 10 where irradiation targets 250 may enter an instrumentation tube 50. For example, as shown in FIG. 2, penetration tubing 1100 penetrates access barrier 411 and extends to instrumentation tubes 50. Penetration tubing 1100 may pass through an existing penetration in access barrier 411, such as an existing TIP tube penetration, or may use a new penetration created for penetration tubing 1100. Penetration tubing 1100 negotiates or passes through any other objects inside of access barrier 411 before reaching instrumentation tube 50.

An annular reactor pedestal 412 may be present in a drywell 20 beneath reactor 10, and penetration tubing 1100 is shown in FIG. 2 passing through a penetration in pedestal 412. It is understood that penetration pathways may follow any number of different courses and negotiate different obstacles in different reactor designs aside from the specific example path shown with penetration tubing 1100 in FIG. 2. Similarly, penetration pathways need not be consistent or uniform; for example, penetration tubing 1100 may terminate on either side of, and be connected to, a penetration in pedestal 412 to permit irradiation targets 250 to pass through the penetration between penetration tubing 1100.

Penetration pathways useable in example embodiment system 1000 may terminate at or within an instrumentation tube 50. As shown in FIG. 2, penetration tubing 1100 terminates at a flange 1110 at a base of instrumentation tube 50, permitting irradiation targets 250 to pass from penetration tubing 1100 into instrumentation tube 50. Similarly, penetration tubing 1100 may join with an indexer that provides access to several instrumentation tubes 50 from a single penetration through reactor wall 411 and/or pedestal 412. Such a system is described in US Patent Publication 2013/0315361, titled "Systems and Methods for Processing Irradiation Targets Through Multiple Instrumentation Tubes in a Nuclear Reactor," filed May 22, 2012, said application incorporated herein by reference in its entirety.

Penetration pathways useable in example embodiments may be pre-existing in part or in whole and/or installed during access to containment areas and/or restricted access areas in a nuclear power plant, such as during a pre-planned outage. For example, penetration tubing 1100 may be installed in access barrier 411 during an outage, with penetration tubing 1100 being passed through penetrations in access barrier 411 and pedestal 412, moved and secured in an area within access barrier 411 and a drywell space 20 under reactor 10, and secured to flange 1110. Portions of penetration tubing 1100 extending outside access barrier 411 may be installed at loading junction 1200 at any time. Penetration tubing 1100 may be secured at various points inside access barrier 411 and/or divert around existing equipment to minimize congestion or clutter in a drywell 20 or other space bounded by access barrier 411 while preserving a traversable path for irradiation targets 250 to and from instrumentation tube 50. Again, other penetration pathways, including wire guides, meshes, compartments, bored tunnels, etc. are useable in example embodiments to provide a path from outside an access-restricted area such as containment to an instrumentation tube of an operating nuclear reactor.

System 1000 may be dual purpose throughout and equally used with a TIP drive or other instrumentation and reactor components. Or system 100 may be exclusively dedicated to isotope production and harvesting with its own driving mechanism, pathways, reservoirs, etc. and excluding use with other instrumentation or a TIP drive. Or system 1000 may be exclusive in some part and shared in others. For example, outside of pedestal 412 and/or drywell 20, example embodiment system 1000 may be dedicated to irradiation target production and harvesting. Within pedestal 412 and drywell 20, space may be at a premium and installation of new dedicated components and/or movement of other components may be undesirable, such that example system 1000 may use and share pathways with conventional TIP drives and instrumentation. A shared functionality system is described in US Patent Publication 2013/0177125, titled "Systems and Methods for Managing Shared-Path Instrumentation and Irradiation Targets in a Nuclear Reactor" by Heinold et al., filed Dec. 10, 2012, that application being incorporated by reference in its entirety herein.

Because example embodiment systems may be dual-use and/or because it may be desirable to retain irradiation targets 250 within instrumentation tubes without requiring constant fill or blockage of one or more penetration pathways, example embodiment systems can include a holding mechanism at flanges 1110 to preserve irradiation targets 250 within instrumentation tubes 50 for desired amounts of time and/or at desired axial levels.

Figure 3:
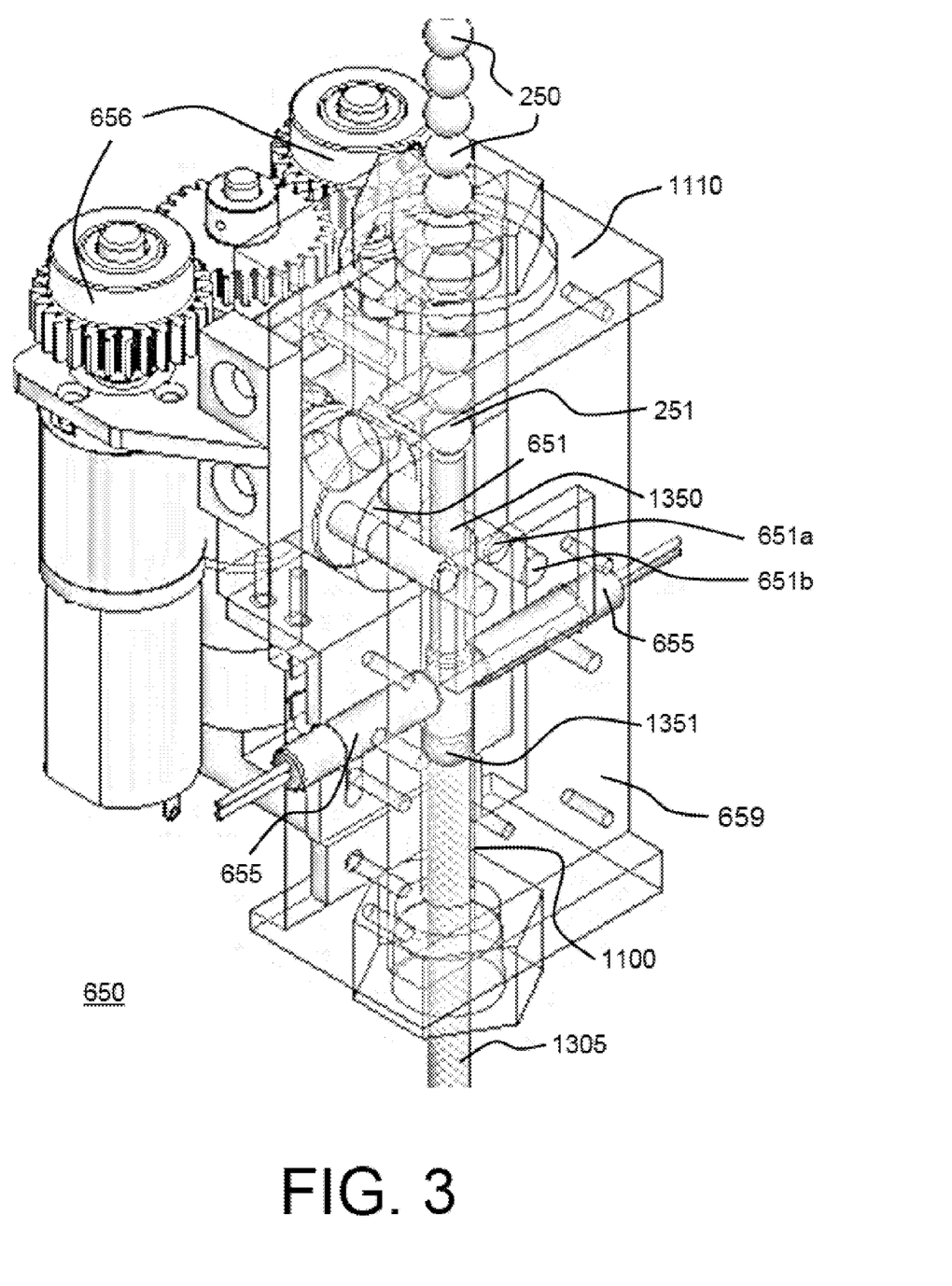
FIG. 3 is an illustration of an example embodiment retention assembly.

FIG. 3 is an illustration of an example embodiment retention assembly 650 useable in example embodiment systems. As shown in FIG. 3, example embodiment retention assembly 650 may be installed about a flange 1110 of an instrumentation tube 50 (FIG. 2). For example, retention assembly may include a frame 659 that provides an air-tight enclosure attached directly to flange 1110 and an associated instrumentation tube. A penetration pathway, 1100 may extend completely or partially through example embodiment retention assembly 650, and irradiation targets 250 may travel therein. Example embodiment retention assembly 650 may include a restricting fork 651 or other retaining structure that blocks movement of irradiation targets 250 through penetrations pathway 1100 and/or into/out from instrumentation tubes. As shown in FIG. 3, restricting fork 651 is moveable between at least two positions 651a and 651b, selectively restricting irradiation target 250 movement.

Figure 4:
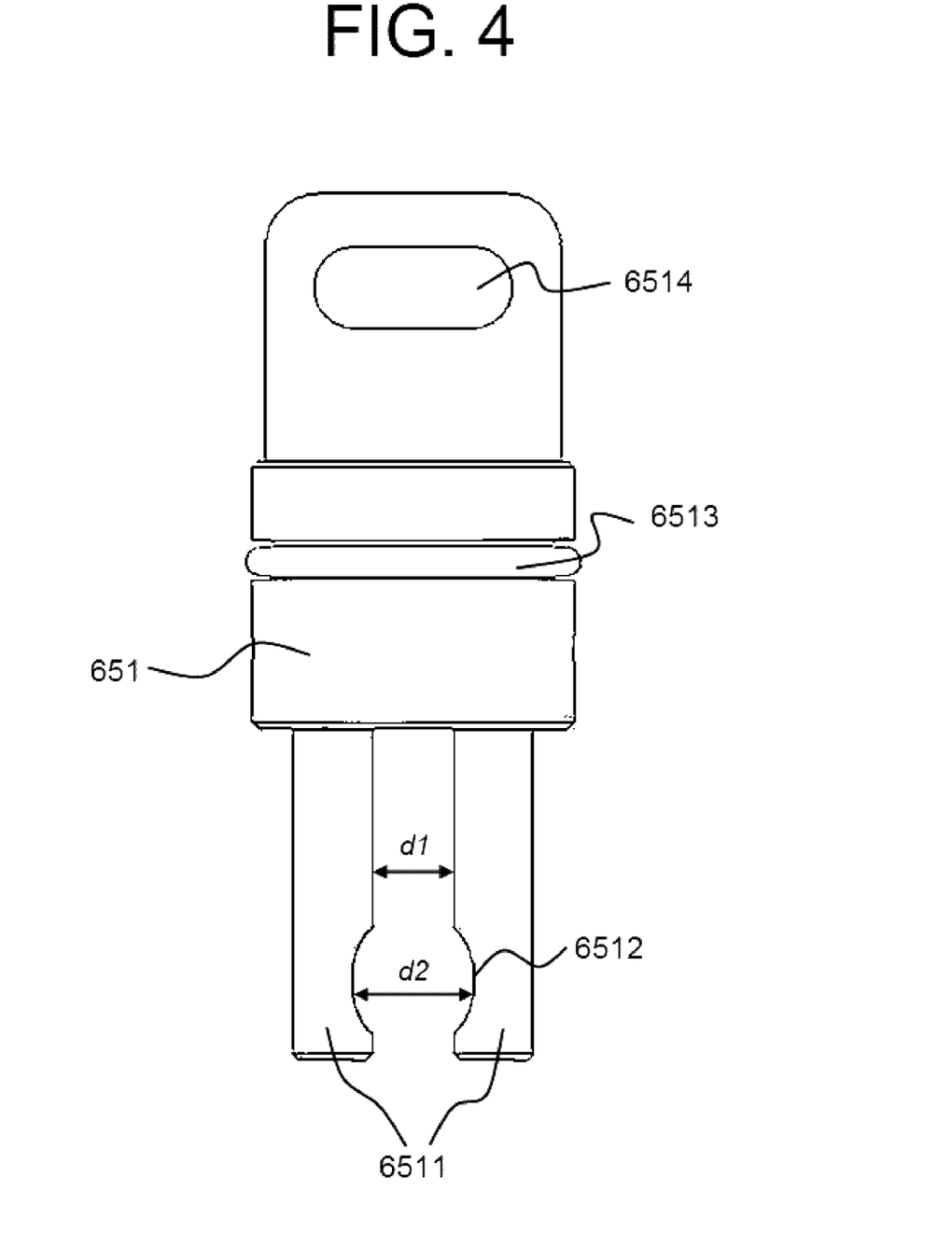
FIG. 4 is an illustration of an example embodiment restricting fork.

FIG. 4 is an illustration of an example embodiment restricting fork 651. As shown in FIG. 4, restricting fork 651 includes two prongs 6511 that are shaped and sized to pass around opposite sides of a penetration pathway in which irradiation targets pass. Prongs 6511 include variable separation so as to provide variable blockage to irradiation targets passing or blocked therebetween. For example, each prong 6511 may include a matching interior surface divot 6512 to provide a greater separation d2 and more passage room between prongs 6511 at interior surface divots 6512. At other points, prongs 6511 may be spaced with lesser separation d1 that prevents irradiation targets of a particular size from passing between prongs 6511. Lesser separation d1 may still permit movement of other features, such as plunger 1350 (FIG. 3) to pass therebetwen, thereby permitting discriminatory movement within penetration pathway 1100 (FIG. 3). It is understood that while example embodiment retention assembly 650 may use a restricting fork 651 to provide discriminatory hold and pass functionality to penetration pathways, other devices may similarly achieve this goal in example embodiments, including a choke valve, magnets, retractable blocking post, tube seal, etc.

Divots 6512 may be placed at appropriate transverse positions to intersect penetration pathways 1100 (FIG. 3) only at a retracted position 651a (FIG. 3). As such, in retracted position 651a (FIG. 3), restricting fork 651 may permit irradiation targets 250 (FIG. 3) to pass through prongs 6511, while in an extended position 651b (FIG. 3), restricting fork 651 may restrict or crimp penetration pathway 1100 (FIG. 3) to prevent irradiation targets 250 (FIG. 3) from passing therebetween.

Example embodiment restricting fork 651 may further include a driving adapter 6514 that attaches to a piston or other reliable driving mechanism to move fork 651 into desired positions. For example, driving adapter 6514 can be a simple ring that engages with a piston to move fork 651 between positions 651a and 651b (FIG. 3). Example embodiment restricting form 651 may further include an O-ring seal 6513 that seals an interior of frame 659 of example embodiment retention assembly 650. In this way, retention assembly 650 may preserve an air-tight seal about flange 1110 and ensure any pneumatic driving fluid, such as that provided through pneumatic lines 510 and 509, is directed into penetration pathways to move irradiation targets.

As shown in FIG. 3, example embodiment retention assembly 650 further includes a driving force to move restricting fork 651 to desired positions. For example, one or more motors 656 can be connected to a crankshaft and piston that drives restricting fork 651 back and forth perpendicular to penetration pathway 1100. Such motors 651 can provide high reliability of positioning and movement of restricting fork 651 as well as statuses and commands to remote users. Motors 656 may provide functionality and be configured similarly to motors, driveshafts, and pistons of the incorporated Heinold co-pending application. Of course, any other co-located or remote driving devices may be used to move restricting fork 651 into and between desired positions, including pneumatic air sources, fail-safe solenoids, etc.

Restricting fork 651 can move relative to penetration pathway 1100 holding irradiation targets 250 and plunger 1350, from positions 651a to 651b and vice versa, depending on a desired restriction and passability of penetration pathway 1100. Plunger 1350 in example embodiment driving systems may be sized smaller than irradiation targets 250 in order to freely pass between restricting fork 651 in any position, whereas irradiation targets 250 may not. For example, restricting fork 651 may have prongs 6511 spaced d1 apart, where d1 corresponds to a length greater than a diameter of plunger 1350. Irradiation targets 250 in example systems may be sized larger than d1 but smaller than d2 created by surface divots 6512, such that irradiation targets 250 will be moveable in penetration pathway 1100 only when restring fork 651 is in pass position 651a.

In the example of FIG. 3, irradiation targets 250 may be driven into and through example embodiment retention assembly 650 and into an instrumentation tube. Retention fork 651 may be in pass position 651a during this driving, such that irradiation targets 250 and plunger 1350 can pass through retention fork 651 in penetration pathway 1100 and into an instrumentation tube, without fork 651 restricting such insertion. Once irradiation targets 250 are above restricting fork 651, motors 656 can drive retention fork 651 forward into hold position 651b, where penetration pathway 1100 is restricted. For example, penetration pathway may be a flexible plastic that restricts when contacted by restricting fork 651 and/or penetration pathway 1100 may include a gap that allows prongs of restricting fork 651 to selectively block irradiation targets 250 without permitting their escape from penetration pathway 1100.

Figure 5:
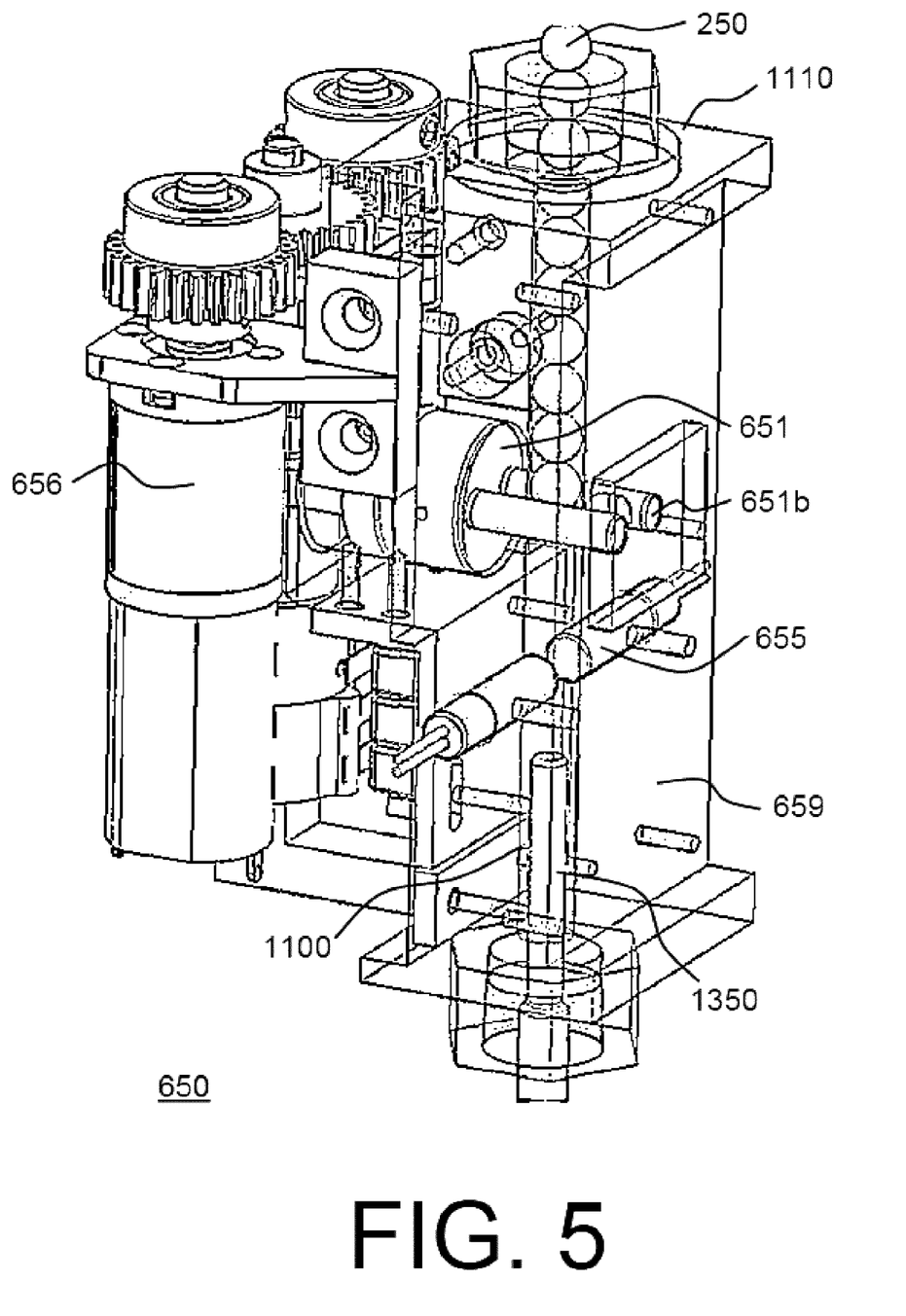
FIG. 5 is an illustration of an example embodiment retention assembly.

As shown in FIG. 5, plunger 1350 may be withdrawn from irradiation targets 250 while restricting fork 651 maintains irradiation targets 250 in static desired axial positions for irradiation. Plunger 1350 may be entirely withdrawn from retention assembly 650 and penetration pathway 1100, allowing their use with other systems while irradiation targets 250 are maintained in an instrumentation tube for irradiation. Fork 651 and motors 656 may be configured with sufficient strength and power to hold several pounds of irradiation targets 250 aligned axially within an instrumentation tube and bearing on prongs of fork 651, while also permitting movement of restricting fork 651 between desired positions. One or more positioning irradiation targets 251 may be used to prop up irradiation targets 250 to desired axial positions within an instrumentation tube, and/or to demarcate where a chain of harvestable irradiation targets 250 ends/begins. When irradiation is complete, or at any other point when evacuation of an instrumentation tube is desired, motors 656 can drive fork 651 back into pass position 651a, and irradiation targets 250 may descend into penetration pathway 1100 via gravity, with or without the aid of plunger 1350.

Example embodiment retention assembly 650 may further include a position detector that detects whether irradiation targets 250 and/or plunger 1350 are in a desired position for movement of restricting fork 651. As shown in FIGS. 3 and 5, example embodiment retention assembly 650 may include one or more reed switches 655 positioned about penetration pathway 1100 that detect a presence of a magnetic member therein and report a signal to an operator and/or motor 656 to indicate such detection. Reed switches 655 may be configured to detect presence of a magnet 1351 positioned within plunger 1350 and/or TIP cable 1305, or a presence of a ferromagnetic positioning irradiation target 251, for example.

Based on the position of these magnetic features, reed switches 655 may trip only when irradiation targets 250 are in desired positions for fork 651 to move between positions 651a and 651b. For example, a magnet 1351 in plunger 1350 may be configured and positioned such that it trips reed switches 655 only at a location where plunger 1350 has driven all irradiation targets 250 beyond restricting fork 651, as shown in FIG. 3. Upon trip, reed switches 655 may actuate motors 656 to move restriction fork 651 from pass position 651a to hold position 651b, allowing plunger 1350 to be withdrawn while retaining irradiation targets against prongs of fork 651. Still further, reed switches 655 may detect several positions of magnet 1351 based on magnetic field strength, such as an approach of magnet 1351 toward reed switches 655, and report such positioning and/or approach to a user, motors 656, and or other automated components. In this way, TIP cable 1305, plunger 1350, and/or any TIP drive pushing the same may be slowed when such an approach is detected, permitting greater positioning accuracy, magnetic detection, and/or preventing overshoot or inertial lifting of irradiation targets 250 and plunger 1350 beyond desired positions.

Reed switches 655 and/or motors 656 may be self-powered and -contained as a relatively small unit in example embodiment retention assembly 650 about flange 1110, so as to permit installation of several example embodiments at several instrumentation tubes, if desired, without requiring excess wiring or power. Still further, a shared wiring system and/or wireless communications units may communicatively connect example embodiment retention assemblies 650 to a user or other manual or automatic devices for coordination within an example embodiment system 1000 to irradiate and harvest desired isotopes. Example embodiment retention assembly 650 may reliably provide selective movability to irradiation targets 250 through penetration pathway 1100, and, as such, is fabricated of materials that are resilient in operating nuclear power plant conditions. For example, retention assembly 650 may be useable in the systems described in incorporated application Ser. No. 13/477,244 at flange 1110 to replace and/or be used with various mechanisms described therein for controlling irradiation target movement.

Example embodiments and methods thus being described, it will be appreciated by one skilled in the art that example embodiments may be varied and substituted through routine experimentation while still falling within the scope of the following claims. For example, the locations of retention devices that allow movement or holding of irradiation targets or other system components are not limited to the specific systems shown and described in the figures—other specific devices and systems for reliably preserving irradiation targets in an instrumentation tube are equally useable as example embodiments and fall within the scope of the claims. Furthermore, it is understood that example systems and methods are useable in any type of nuclear plant with access barriers that prevent unlimited access to the reactor, including known light water reactor designs, graphite-moderated reactors, and/or molten salt reactors, as well as any other nuclear plant design. Such variations are not to be regarded as departure from the scope of the following claims.

What is claimed is:

1. A system for delivering and retrieving irradiation targets through a nuclear reactor, the system comprising:
a loading/offloading system providing irradiation targets, wherein the loading/offloading system is outside of an access barrier of the nuclear reactor;
a penetration pathway extending completely through the access barrier and connecting the loading/offloading system to one of a plurality of instrumentation tubes outside the nuclear reactor, wherein the penetration pathway is traversable by the irradiation targets to the instrumentation tube;
a retention mechanism including a mechanical hold inside the access barrier and coupled to the penetration pathway at a flange of the instrumentation tube immediately outside the reactor, wherein the mechanical hold is configured to block access to or from the instrumentation tube to hold the irradiation targets within the instrumentation tube;
a plurality of the irradiation targets, wherein the irradiation targets and the mechanical hold are sized to prevent movement of the irradiation targets out of the instrumentation tube past the mechanical hold when the penetration pathway is evacuated; and
a drive positioned outside the access barrier, wherein the drive includes a plunger configured to extend through the access barrier in the penetration pathway and past the mechanical hold.

2. The system of claim 1, wherein the mechanical hold is a restriction fork having at least two prongs that extend around opposite sides of the penetration pathway.

3. The system of claim 2, wherein the prongs of the restriction fork are spaced apart less than a width of the irradiation targets, and wherein the prongs include matching and facing surface divots spaced apart greater than a width of the irradiation targets.

4. The system of claim 3, wherein the restriction fork blocks passage of the irradiation targets through the penetration pathway with the prongs, and wherein the restriction fork allows passage of the irradiation targets through the penetration pathway when moved such that the surface divots align with the penetration pathway.

5. The system of claim 3, wherein the prongs of the restriction fork are spaced apart more than a width of the plunger driving the irradiation targets.

6. The system of claim 1, wherein the retention mechanism further includes at least one motor connected to the mechanical hold, wherein the motor drives the mechanical hold to block or unblock passage area within the penetration pathway.

7. The system of claim 1, wherein the retention mechanism includes a position detector configured to detect a position of the irradiation targets in the penetration pathway.

8. The system of claim 7, wherein the position detector is at least one reed switch.

9. The system of claim 8,
wherein the plunger is a magnetized plunger having a width smaller than the irradiation targets that passes through the retention mechanism.

10. The system of claim 9, wherein the magnetized plunger includes a discreet magnet detectable by the reed switch, and wherein the discreet magnet is positioned in the plunger at a location corresponding to full insertion of the irradiation targets in the instrumentation tube.

11. The system of claim 10, wherein the reed switches are positioned to trip the retention mechanism when the magnet is detected at the location, and wherein the reed switches are configured to notify the drive system based on an approach of the magnet.

12. The system of claim 9, wherein the drive system is outside the access barrier except for the plunger that is configured to extend to the instrumentation tube inside the access barrier.

13. The system of claim 1, wherein the retention assembly includes a casing directly attached to the flange of the instrumentation tube.

14. The system of claim 13, wherein the casing is configured to be sealed and allow airflow only into the penetration pathway.

15. The system of claim 1, wherein the system includes a plurality of the penetration pathways connecting the loading/offloading system to a plurality of the instrumentation tubes, and a plurality of the retention mechanisms each coupled to one of the penetration pathways.

16. The system of claim 1, wherein the nuclear reactor is a commercial nuclear reactor that generates heat that is converted to electricity during operation, wherein the access barrier is a containment building surrounding the nuclear reactor in an air-tight manner during operation, and wherein the loading/offloading system is accessible during operation.

17. The system of claim 1, wherein the penetration pathway is tubing completely sealed from an interior volume inside the access barrier such that no matter can move through the system from the interior volume outside the access barrier.

* * * * *